US012272236B2

(12) United States Patent
Takamine et al.

(10) Patent No.: US 12,272,236 B2

(45) Date of Patent: Apr. 8, 2025

(54) VEHICLE INFORMATION ESTIMATION SYSTEM, VEHICLE INFORMATION ESTIMATION APPARATUS, VEHICLE INFORMATION ESTIMATION METHOD, AND NON-TRANSITORY COMPUTER READABLE RECORDING MEDIUM

(71) Applicant: Kabushiki Kaisha Toshiba, Tokyo (JP)

(72) Inventors: Hidefumi Takamine, Tokyo (JP); Takashi Usui, Saitama Saitama (JP); Kazuo Watabe, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 603 days.

(21) Appl. No.: 17/463,305

(22) Filed: Aug. 31, 2021

(65) Prior Publication Data

US 2022/0130240 A1 Apr. 28, 2022

(30) Foreign Application Priority Data

Oct. 27, 2020 (JP) ................................. 2020-179929

(51) Int. Cl.

| | |
|---|---|
| ***G08G 1/065*** | (2006.01) |
| ***G01G 19/02*** | (2006.01) |
| ***G08G 1/01*** | (2006.01) |
| ***G08G 1/04*** | (2006.01) |

(52) U.S. Cl.

CPC ............. *G08G 1/065* (2013.01); *G01G 19/02* (2013.01); *G08G 1/0145* (2013.01); *G08G 1/04* (2013.01)

(58) Field of Classification Search

CPC ........ G08G 1/065; G08G 1/04; G08G 1/0145; G01G 19/02

See application file for complete search history.

(56) References Cited

U.S. PATENT DOCUMENTS

| | | | | |
|---|---|---|---|---|
| 10,147,320 | B1 * | 12/2018 | Ellis | G01S 17/931 |
| 10,613,060 | B2 * | 4/2020 | Takamine | G01N 29/069 |
| 2017/0074833 | A1 * | 3/2017 | Takamine | G01N 21/88 |

(Continued)

FOREIGN PATENT DOCUMENTS

| | | |
|---|---|---|
| CN | 110418961 A | 11/2019 |
| CN | 111325305 A | 6/2020 |

(Continued)

OTHER PUBLICATIONS

H. Liu et al., “Vehicle Detection and Classification Using Distributed Fiber Optic Acoustic Sensing,” IEEE Trans. on Vehicular Tech., vol. 69, No. 2, pp. 1363-1374 (2020).

(Continued)

*Primary Examiner* — Peter D Nolan
*Assistant Examiner* — Wae L Louie
(74) *Attorney, Agent, or Firm* — Finnegan, Henderson, Farabow, Garrett & Dunner, LLP

(57) ABSTRACT

According to one embodiment, a vehicle information estimation system according to an embodiment includes at least one sensor and a vehicle count estimator. The at least one sensor detects elastic waves generated from a structure. The vehicle count estimator estimates the number of vehicles that have passed through on the structure using the elastic waves detected by the at least one sensor.

11 Claims, 9 Drawing Sheets

(56) References Cited

U.S. PATENT DOCUMENTS

| | | | | |
|---|---|---|---|---|
| 2017/0138910 | A1* | 5/2017 | Usui | G01N 29/07 |
| 2017/0363586 | A1* | 12/2017 | Takamine | G01N 29/4454 |
| 2019/0206240 | A1* | 7/2019 | Gonçalves | G08G 1/04 |
| 2020/0191825 | A1 | 6/2020 | Miki et al. | |
| 2020/0217822 | A1* | 7/2020 | Someda | G01N 29/44 |
| 2020/0365015 | A1* | 11/2020 | Nguyen | G08G 1/083 |
| 2021/0134081 | A1* | 5/2021 | Claussen | B61L 3/125 |
| 2021/0233403 | A1* | 7/2021 | Sandbrook | G08G 1/0116 |
| 2022/0130240 | A1* | 4/2022 | Takamine | G08G 1/04 |
| 2022/0299406 | A1* | 9/2022 | Usui | G01M 17/10 |
| 2023/0082439 | A1* | 3/2023 | Usui | G01N 29/223 73/597 |
| 2023/0308837 | A1* | 9/2023 | Tsuda | H04W 4/029 |
| 2023/0324345 | A1* | 10/2023 | Takamine | G01N 29/223 |
| 2023/0334120 | A1* | 10/2023 | Clifford | G08G 1/065 |

FOREIGN PATENT DOCUMENTS

| | | | |
|---|---|---|---|
| EP | 3 761 022 | A1 | 1/2021 |
| JP | S61-256499 | | 11/1986 |
| JP | 2004-252520 | A | 9/2004 |
| WO | WO 2019/033185 | A1 | 2/2019 |
| WO | WO 2019/167137 | A1 | 9/2019 |

OTHER PUBLICATIONS

R. Bajwa et al., "In-Pavement Wireless Sensor Network for Vehicle Classification," Int'l Conf. on Information Processing in Sensor Networks (IPSN) 2011, pp. 85-96 (2011).

J. Rivas et al., "Road Vibrations as a Source to Detect the Presence and Speed of Vehicles," IEEE Sensors J., vol. 17, No. 2, pp. 377-385 (2017).

* cited by examiner

VEHICLE INFORMATION ESTIMATION SYSTEM, VEHICLE INFORMATION ESTIMATION APPARATUS, VEHICLE INFORMATION ESTIMATION METHOD, AND NON-TRANSITORY COMPUTER READABLE RECORDING MEDIUM

CROSS-REFERENCE TO RELATED APPLICATION

This application is based upon and claims the benefit of priority from Japanese Patent Application No. 2020-179929, filed Oct. 27, 2020, the entire contents of which are incorporated herein by reference.

FIELD

Embodiments described herein relate generally to a vehicle information estimation system, a vehicle information estimation apparatus, a vehicle information estimation method, and anon-transitory computer readable recording medium.

BACKGROUND

When a load according to traffic is applied to a concrete floor slab of a bridge, acoustic emission (AE) occurs in accordance with development of cracks, friction, and the like inside the concrete floor slab. By installing an AE sensor on a face different from a face to which the load is applied (for example, a floor slab lower face), AE occurring inside the concrete floor slab can be detected. In the related art, installing an AE sensor on a lower face of a concrete floor slab, detecting elastic waves generated in accordance with the passage of vehicles using the AE sensor, and evaluating the soundness of the concrete floor slab on the basis of a density of generation sources of a plurality of elastic waves that have been detected have been performed.

Meanwhile, in a case in which results of measurements of different concrete floor slabs are compared with each other, it is effective to compare measurement results obtained under the same conditions of traffic volumes with each other. For example, the density of generation sources becomes higher when measurement is performed for a longer time, and thus, when measurement times are different from each other, the densities cannot be compared with each other. In addition, even when the measurement time is the same, the density of elastic wave sources tends to be higher when measurement is performed at a place at which a traffic volume is larger or at a time at which a traffic volume is larger, and thus, even when measurement results obtained under different conditions are compared with each other, an effective result may not be able to be obtained. For this reason, in order to compare different measurement results under the same conditions, information relating to vehicles traveling at a measurement target place needs to be understood.

DETAILED DESCRIPTION

The present invention provides a problem to be solved by the present invention is to provide a vehicle information estimation system, a vehicle information estimation apparatus, a vehicle information estimation method, and a non-transitory computer readable recording medium capable of estimating information relating to vehicles traveling at a measurement target place for comparing different measurement results with each other.

According to one embodiment, a vehicle information estimation system according to an embodiment includes at least one sensor and a vehicle count estimator. The at least one sensor detects elastic waves generated from a structure. The vehicle count estimator estimates the number of vehicles that have passed through on the structure using the elastic waves detected by the sensor.

Hereinafter, a vehicle information estimation system, a vehicle information estimation apparatus, a vehicle information estimation method, and a non-transitory computer readable recording medium according to embodiments will be described with reference to the drawings.

First Embodiment

Figure 1:
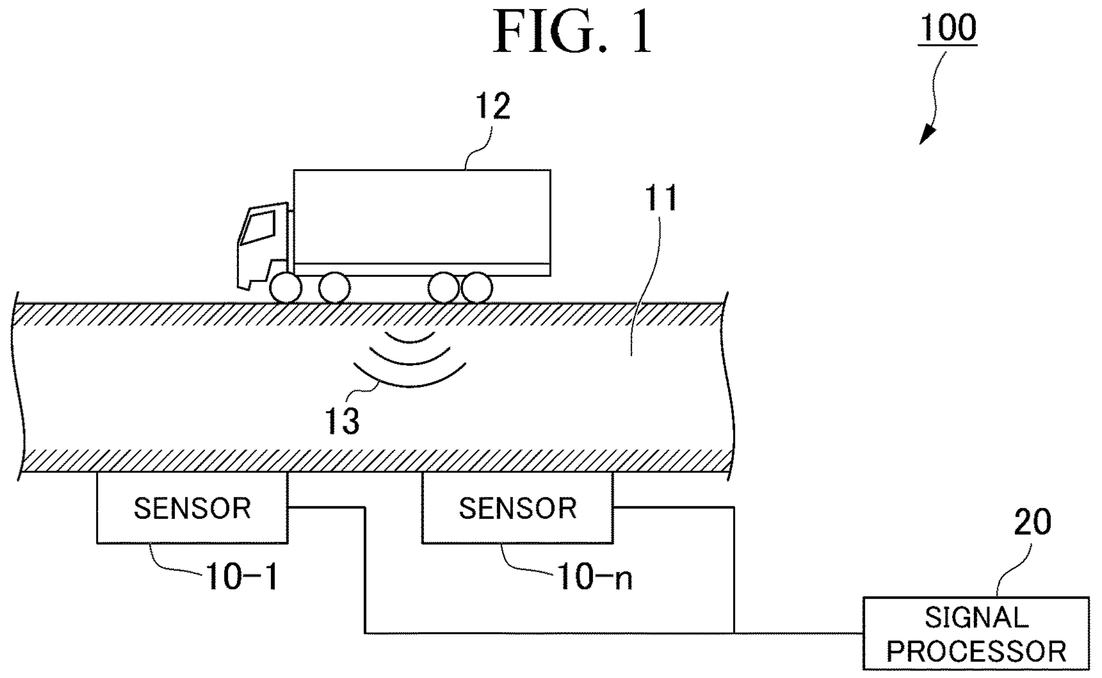
FIG. 1 is a diagram illustrating the configuration of a vehicle information estimation system according to a first embodiment.

FIG. 1 is a diagram illustrating the configuration of a vehicle information estimation system 100 according to a first embodiment. The vehicle information estimation system 100 is a system that estimates information relating to vehicles 12 that have passed through on a structure 11 (hereinafter, referred to as "passing vehicles"). For example, the information relating to vehicles is the number of vehicles that have passed, a weight of vehicles that have passed, speeds of vehicles that have passed, and the like within a measurement period.

In the following description, for example, although a bridge composed of concrete will be described as an example of a structure, the structure does not need to be limited to a bridge. The structure may be any structure in which elastic waves are generated in accordance with occurrence or development of cracks or external shocks (for example, rain, artificial rain, or the like). For example, the structure may be a bedrock. In addition, the bridge is not limited to a structure that is built over a river, a valley, or the like and includes various structures and the like disposed above the ground surface (for example, a viaduct of an expressway).

Hereinafter, a specific configuration of the vehicle information estimation system 100 will be described.

The vehicle information estimation system 100 includes a plurality of sensors 10-1 to 10-*n* (here, n is an integer equal to or greater than "1") and a signal processor 20. The plurality of sensors 10-1 to 10-*n* and the signal processor 20 are connected to be able to communicate with each other in a wired manner. In the following description, in a case in which the sensors 10-1 to 10-*n* do not need to be distinguished from each other, one thereof will be described as a sensor 10.

The sensor 10 detects elastic waves 13 generated from the inside of the structure 11. The sensor 10 is installed at a position at which the elastic waves 13 can be detected. For example, the sensor 10 is installed on a face different from a face of the structure 11 to which a load is applied. In a case in which the face to which a load is applied is a front face of the structure 11 (hereinafter, referred to as a "road surface"), the sensor 10 is installed on one of a side face and a bottom face of the structure 11. The sensor 10 converts the detected elastic waves 13 into an electrical signal. In the following description, a case in which the sensor 10 is installed on the bottom face of the structure 11 will be described as an example.

In the sensor 10, for example, a piezoelectric element having sensitivity in the range of 10 kHz to 1 MHz is used. The type of the sensor 10 may be any one of a resonance type having a resonance peak within a frequency range, a broadband type in which resonance is suppressed, and the like. A method for detecting the elastic waves 13 that is used by the sensor 10 may be any one of a voltage output type, a variable resistance type, a static capacitance type, and the like.

An acceleration sensor may be used in place of the sensor 10. In such a case, the acceleration sensor detects an elastic waves 13 generated inside the structure 11. Then, by performing a process similar to that of the sensor 10, the acceleration sensor converts the detected elastic waves 13 into an electrical signal.

The signal processor 20 has an electrical signal output from the sensor 10 as its input. The signal processor 20 performs signal processing on the input electrical signal. Examples of the signal processing performed by the signal processor 20 include noise elimination, parameter extraction, and estimation of information relating to passing vehicles. The signal processor 20 is configured using an analog circuit or a digital circuit. For example, the digital circuit is realized by a field programmable gate array (FPGA) or a microcomputer. The digital circuit may be realized by a dedicated large-scale integration (LSI). In addition, a nonvolatile memory such as a flash memory or a detachable memory may be mounted in the signal processor 20. The signal processor 20 is one type of vehicle information estimation apparatus.

As illustrated in FIG. 1, when a vehicle 12 passes on the structure 11, a load is applied to a road surface in accordance with contact between tires of the vehicle 12 and the road surface. Many elastic waves 13 are generated inside the structure 11 in accordance with curvature according to a load. The sensor 10 installed on the lower face of the structure 11 can detect elastic waves generated inside the structure 11.

Figure 2:
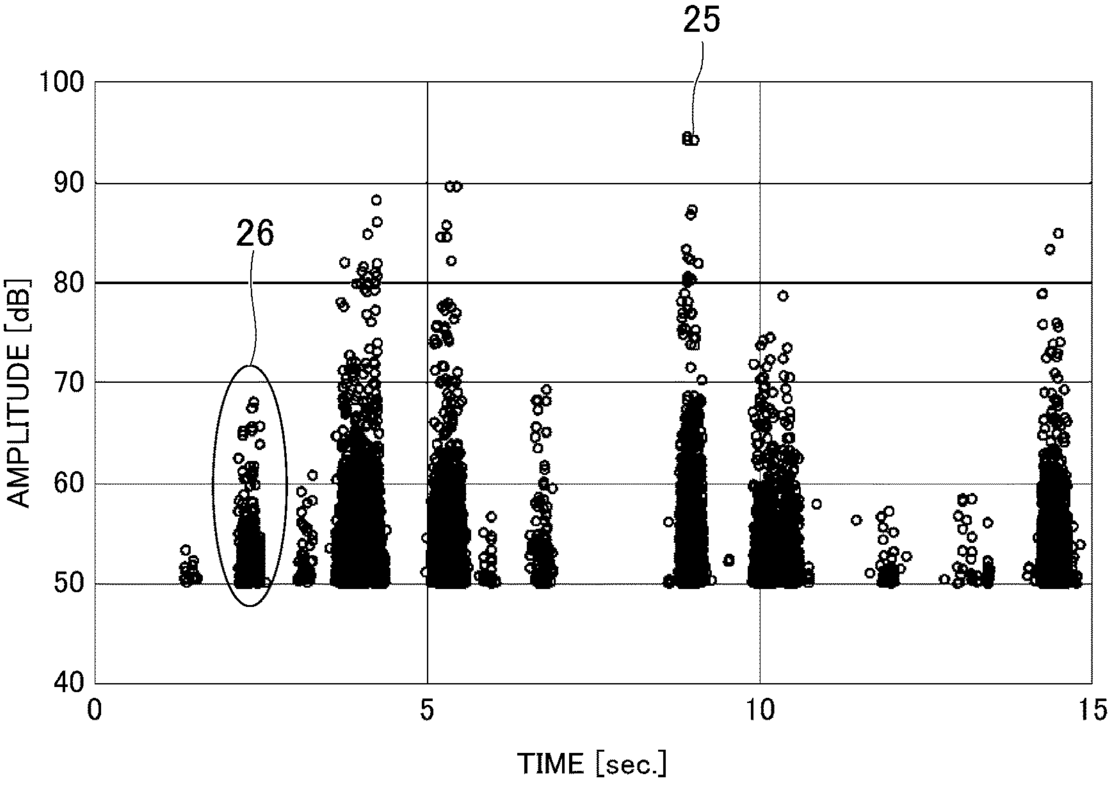
FIG. 2 is a diagram illustrating a distribution of elastic waves detected in accordance with the passage of vehicles.

FIG. 2 is a diagram illustrating a distribution of general elastic waves detected by the sensor 10 in accordance with passage of vehicles 12. A plurality of points 25 illustrated in FIG. 2 illustrate elastic waves detected by the sensor 10 within a measurement period (0 to 15 seconds in FIG. 2). As can be understood from FIG. 2, every time a vehicle 12 passes, a large quantity of elastic waves are generated as in those enclosed by a circle 26. The large quantity of elastic waves are elastic waves that are generated in a relatively short period. Hereinafter, elastic waves generated in a relatively short period in this way are regarded as elastic waves included in one event. For example, this relatively short period is determined on the basis of an inter-vehicle distance. Specific details will be described below. Here, an event is a group in which a plurality of elastic waves obtained in a relatively short period as described above are set as one set. In this embodiment, by counting one set of such a large quantity of elastic waves (one set represented by the circle 26) as one group, the number of passing vehicles can be estimated from elastic waves only. For example, in the example illustrated in FIG. 2, there are 12 sets of elastic waves, and thus, by counting the elastic waves as 12 groups, it can be estimated that 12 vehicles 12 have passed within the measurement period.

Here, the reason for the magnitude of the amplitude of detected elastic waves being different for each group is that the sizes of passing vehicles are different. When the size of a vehicle becomes larger, the load applied to the structure 11 becomes heavier. For this reason, many elastic waves having large amplitudes are generated. In this way, by observing the distribution of elastic waves illustrated in FIG. 2, not only the number of passing vehicles but also sizes of the passing vehicles, in other words, weights thereof can be estimated.

In the first embodiment, a specific configuration of the signal processor 20 for estimating the number of passing vehicles will be described.

Figure 3:
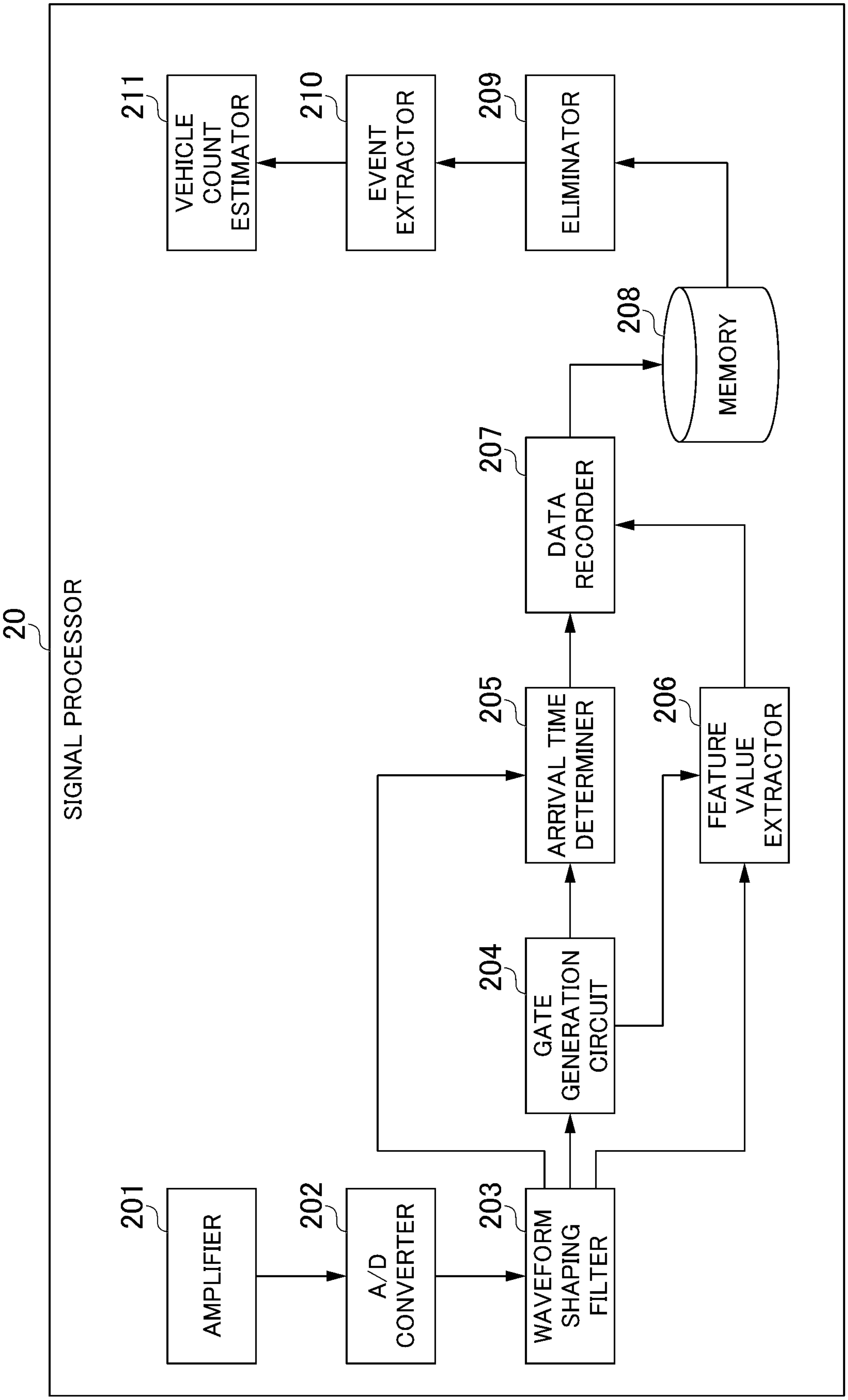
FIG. 3 is a schematic block diagram illustrating functions of a signal processor according to the first embodiment.

FIG. 3 is a schematic block diagram illustrating functions of the signal processor 20 according to the first embodiment. The signal processor 20 includes an amplifier 201, an A/D converter 202, a waveform shaping filter 203, a gate generation circuit 204, an arrival time determiner 205, a feature value extractor 206, a data recorder 207, a memory 208, an eliminator 209, an event extractor 210, and a vehicle count estimator 211.

The amplifier 201 amplifies elastic waves output from the sensor 10 and outputs amplified elastic waves to the A/D converter 202. For example, the amplifier 201 amplifies elastic waves by a predetermined value (for example 10 times to 100 times).

The A/D converter 202 converts the amplified elastic waves into a digital signal by quantizing the amplified elastic waves. The A/D converter 202 outputs the digital signal to the waveform shaping filter 203.

The waveform shaping filter 203 eliminates noise components outside a predetermined band from the input digital signal. For example, the waveform shaping filter 203 is a digital band pass filter (BPF). The waveform shaping filter 203 outputs the digital signal after elimination of noise components (hereinafter, referred to as a "noise-eliminated signal") to the gate generation circuit 204, the arrival time determiner 205, and the feature value extractor 206.

The gate generation circuit 204 has the noise-eliminated signal output from the waveform shaping filter 203 as its input. The gate generation circuit 204 generates a gate signal on the basis of the input noise-eliminated signal. The gate signal is a signal that indicates whether or not a waveform of the noise-eliminated signal is continuous.

For example, the gate generation circuit 204 is realized by an envelope detector and a comparator. The envelope detector detects an envelope of the noise-eliminated signal. For example, an envelope is extracted by squaring the noise-eliminated signal and performing predetermined processing (for example, processing using a low pass filter or Hilbert transformation) on a squared output value. The comparator judges whether or not the envelope of the noise-eliminated signal is equal to or larger than a predetermined threshold.

In a case in which the envelope of the noise-eliminated signal is equal to or larger than the predetermined threshold, the gate generation circuit 204 outputs a first gate signal indicating that the waveform of the noise-eliminated signal is continuous to the arrival time determiner 205 and the feature value extractor 206. On the other hand, in a case in which the envelope of the noise-eliminated signal is smaller than the predetermined threshold, the gate generation circuit 204 outputs a second gate signal indicating that the waveform of the noise-eliminated signal is not continuous to the arrival time determiner 205 and the feature value extractor 206.

The arrival time determiner 205 has the noise-eliminated signal output from the waveform shaping filter 203 and the gate signal output from the gate generation circuit 204 as its inputs. The arrival time determiner 205 determines an elastic wave arrival time using the noise-eliminated signal input while the first gate signal is input. The arrival time determiner 205 outputs the determined elastic wave arrival time to the data recorder 207 as time information. The arrival time determiner 205 does not perform processing while the second gate signal is input. The elastic wave arrival time corresponds to an acquisition time of elastic waves.

The feature value extractor 206 has a noise-eliminated signal output from the waveform shaping filter 203 and a gate signal output from the gate generation circuit 204 as its inputs. The feature value extractor 206 extracts feature values of the noise-eliminated signal using the noise-eliminated signal input while the first gate signal is input. The feature value extractor 206 does not perform processing while the second gate signal is input. A feature value is information that represents a feature of the noise-eliminated signal.

For example, the feature values are the amplitude of a waveform [mV], a rise time of the waveform [usec], a continuation time of a gate signal [usec], a zero-cross count number [times], an energy of the waveform [arb.], a frequency [Hz], a root mean square (RMS) value, and the like. The feature value extractor 206 outputs parameters relating to the extracted feature values to the data recorder 207. When the parameters relating to feature values are output, the feature value extractor 206 associates sensor IDs with the parameters relating to the feature values. A sensor ID represents identification information used for identifying the sensor 10 installed in the structure 11.

For example, the amplitude of the waveform is a value of the maximum amplitude in the noise-eliminated signal. For example, the rise time of the waveform is a time TI until the noise-eliminated signal reaches a maximum value from rise of the gate signal. For example, the continuation time of the gate signal is a time until the amplitude becomes smaller than a value set in advance from rise of the gate signal. For example, the zero-cross count number is the number of times the noise-eliminated signal crosses a reference line passing through a zero value.

For example, the energy of the waveform is a value acquired by performing time integration of squares of the amplitude of the noise-eliminated signal at each of time points. In addition, the definition of the energy is not limited to the example described above and, for example, may be approximated using an envelope of the waveform. The frequency is the frequency of the noise-eliminated signal. For example, the RMS value is a value acquired using a square root and by squaring the amplitudes of the noise-eliminated signal at each of time points.

The data recorder 207 has a sensor ID, time information, and parameters relating to feature values as its inputs. The data recorder 207 records elastic wave data including the sensor ID, the time information, and the parameters relating to the feature values that have been input in the memory 208. For example, the data recorder 207 may record elastic wave data in the memory 208 in order of acquisition or may record elastic wave data in the memory 208 in order of a time series on the basis of the time information.

The memory 208 stores one or more pieces of elastic wave data. For example, the memory 208 is a dual port random access memory (RAM). One piece of elastic wave data is data obtained from one elastic wave.

The eliminator 209 reads the one or more pieces of elastic wave data stored in the memory 208 and eliminates elastic wave data of which a value of the amplitude is smaller than a threshold out of the read the one or more pieces of elastic wave data. For example, the eliminator 209 may eliminate elastic wave data of which a value of the amplitude is smaller than 50 dB. On the other hand, the eliminator 209 outputs elastic wave data of which a value of the amplitude is equal to or larger than the threshold out of the read the one or more pieces of elastic wave data to the event extractor 210. Here, the threshold may be appropriately set. By eliminating data of which the amplitude is low in this way, small noises detected by the sensor 10 are eliminated, and separation of individual vehicles 12 can be improved. For example, by eliminating elastic wave data of which a value of the amplitude is smaller than 50 dB as illustrated in FIG. 2, separation of groups can be performed, and the accuracy of estimation of the number of passing vehicles can be improved. Hereinafter, elastic wave data of which a value of the amplitude is smaller than a threshold will be described as elastic wave data having low amplitude.

The event extractor 210 (a classifier) extracts elastic wave data of one event among a plurality of pieces of elastic wave data output from the eliminator 209. More specifically, by classifying a plurality of pieces of elastic wave data into a plurality of groups in accordance with an acquisition time of each elastic wave, the event extractor 210 extracts elastic wave data for each event among a plurality of pieces of elastic wave data. The event extractor 210 outputs the extracted elastic wave data for each event to the vehicle count estimator 211.

The vehicle count estimator 211 estimates the number of passing vehicles using elastic wave data for each event output by the event extractor 210. More specifically, the vehicle count estimator 211 calculates the number of events (the number of groups) and estimates a result of the calculation as being the number of passing vehicles. In this way, by using a plurality of pieces of elastic waves detected by a plurality of sensors 10, the vehicle count estimator 211 estimates the number of passing vehicles.

Figure 4:
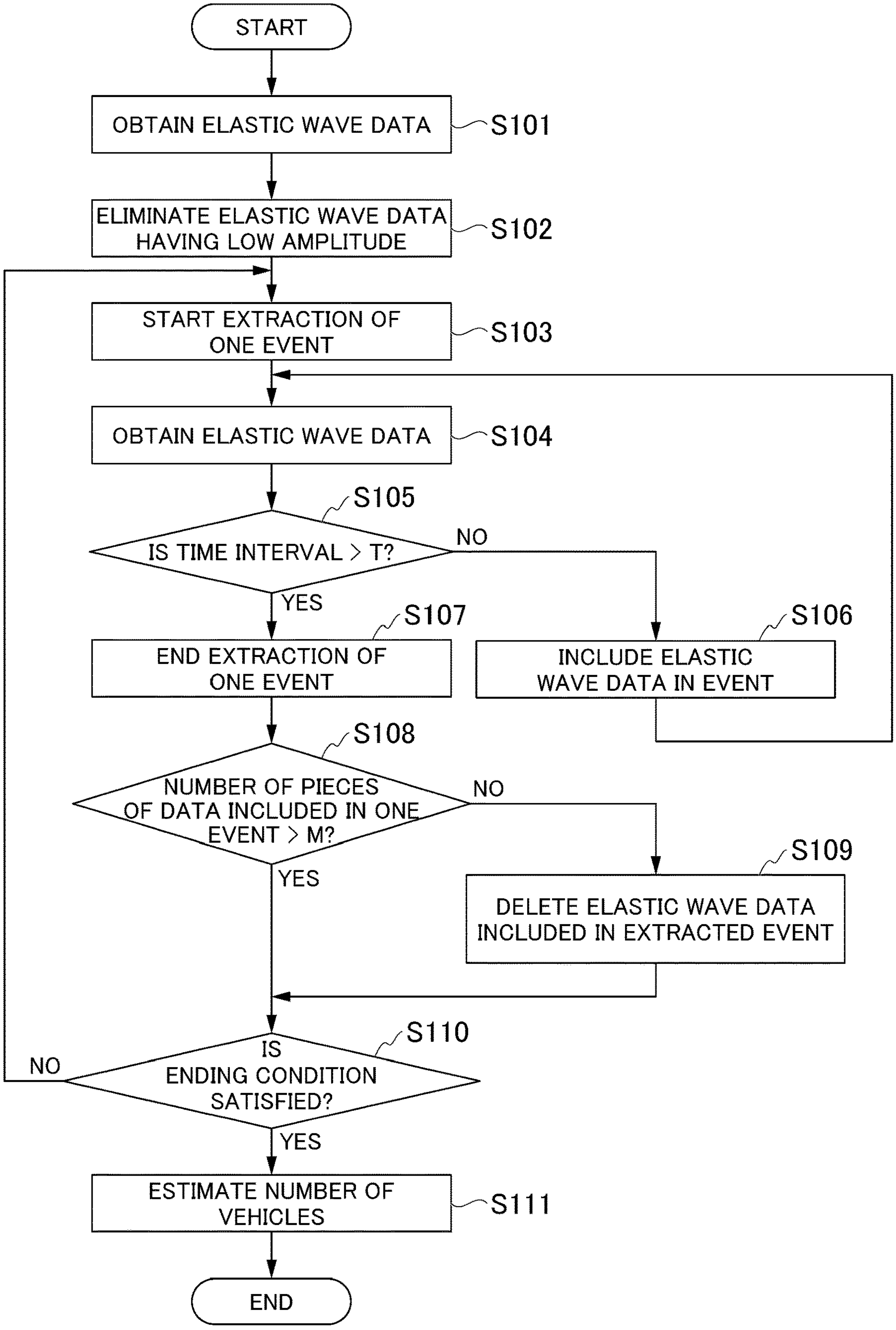
FIG. 4 is a diagram illustrating the flow of a process of estimating the number of vehicles performed by the signal processor according to the first embodiment.

FIG. 4 is a diagram illustrating the flow of a process of estimating the number of vehicles performed by the signal processor 20 according to the first embodiment. The process illustrated in FIG. 4 is performed in a case in which an instruction for performing the process of estimating the number of vehicles is given. It is assumed that a plurality of pieces of elastic wave data detected within a measurement period are stored in the memory 208 when the process illustrated in FIG. 4 is started.

The eliminator 209 acquires the elastic wave data stored in the memory 208 (Step S101). For example, the eliminator 209 acquires a plurality of pieces of elastic wave data stored in the memory 208 in order of a time series. The eliminator 209 eliminates elastic wave data having low amplitude out of the acquired plurality of pieces of elastic wave data (Step S102). The eliminator 209 outputs elastic wave data of which a value of the amplitude is equal to or larger than a threshold to the event extractor 210.

When elastic wave data is acquired from the eliminator 209, the event extractor 210 starts extraction of one event (Step S103). First, the event extractor 210 obtains the elastic wave data output from the eliminator 209 (Step S104). Next, the event extractor 210 judges whether or not an interval between acquisition times of the obtained elastic wave data and elastic wave data that has been previously obtained is T or more (Step S105). Here, T is a value set in advance and is, for example, several hundreds of mm seconds. When the process is started, there is no previous elastic wave data, and thus, in such a case, the event extractor 210 judges that an interval between acquisition times is not T or more.

T may be set on the basis of an inter vehicle distance. More specifically, a maximum value of the interval T may be set in accordance with an inter-vehicle distance, a vehicle speed, and a time until generation of an elastic wave is received after passage of the vehicle 12. Generally, when traveling on a road surface, a vehicle travels with a constant interval with a vehicle traveling ahead maintained. In this way, there is a distance of a certain degree between vehicles. For this reason, there is a time more or less until a vehicle traveling behind passes after passage of one vehicle. For this reason, there is a difference of a certain degree between an acquisition time of an elastic wave generated in accordance with passage of one vehicle and an acquisition time of an elastic wave generated in accordance with passage of a second vehicle in the same sensor 10. Thus, by setting the interval T in accordance with an inter-vehicle distance that is generally assumed, an elastic wave generated in accordance with passage of another vehicle can be configured not to be included in the same group.

The acquisition time interval is not equal to or larger than T (No in Step S105), the event extractor 210 includes the elastic wave data in one event (Step S106). Thereafter, the process of Step S104 is performed.

On the other hand, in a case in which the acquisition time interval is equal to or larger than T (Yes in Step S105), the event extractor 210 ends extraction of one event (Step S107).

The event extractor 210 judges whether or not the number of pieces of elastic wave data included in the information of one event output from the event extractor 210 is equal to or larger than M (Step S108). Here. M is a value set in advance and is, for example, 5. The value of M is a value that is set for eliminating noises. In a case in which the number of pieces of elastic wave data included in information of one event is smaller than M (No in Step S108), the event extractor 210 eliminates elastic wave data included in the information of the extracted one event. The reason for this is that, in a case in which the number of pieces of elastic wave data included in the information of one event is smaller than M, there is the possibility of the elastic wave data being noise.

On the other hand, in a case in which the number of pieces of elastic wave data included in the information of one event is smaller than M (Yes in Step S108), the event extractor 210 outputs the information of the extracted one event to the vehicle count estimator 211. Thereafter, the event extractor 210 judges whether or not an ending condition is satisfied (Step S110). The ending condition is a condition for ending extraction of an event. For example, the ending condition may be a condition of elastic wave data obtained within the measurement period ending or a condition of the measurement period having elapsed. In a case in which the ending condition is satisfied (Yes in Step S110), the vehicle count estimator 211 estimates the number of passing vehicles on the basis of the information of one event output from the event extractor 210 (Step S111). More specifically, the vehicle count estimator 211 estimates a total number of pieces of the information of one event as being the number of passing vehicles.

On the other hand, in a case in which the ending condition is not satisfied (No in Step S110), the signal processor 20 repeatedly performs the processes of Step S103 and subsequent steps. By repeatedly performing the processes of these steps Step S103 to Step S110, a plurality of events are extracted. In other words, a plurality of groups are extracted.

According to the vehicle information estimation system 100 configured as described above, the number of vehicles that have passed through on the structure 11 is estimated using elastic waves detected by the sensors 10. For this reason, in order to compare different measurement results with each other, information relating to vehicles traveling at a place that is a measurement target can be estimated. In accordance with this, pieces of elastic wave data measured by different structures 11 can be compared with each other by normalizing the elastic wave data using the numbers of passing vehicles.

A modified example of the first embodiment will be described.

Figure 5:
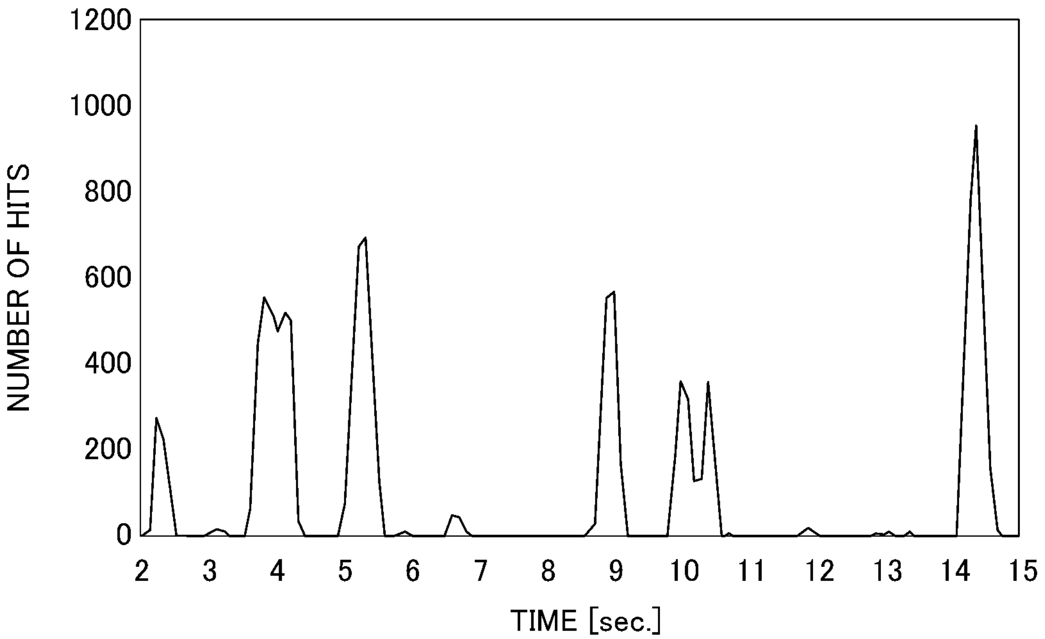
FIG. 5 is a diagram illustrating another technique for estimating the number of passing vehicles according to the first embodiment.

In the embodiment described above, a configuration in which the signal processor 20 estimates the number of passing vehicles in accordance with the number of events has been illustrated. In contrast to this, the signal processor 20 may estimate the number of passing vehicles using another technique. In the case of configuring as such, the signal processor 20 may not include the event extractor 210. As illustrated in FIG. 5, the signal processor 20 may estimate the number of passing vehicles on the basis of a trend of the number of hits per constant time. The number of hits represents the number of times of detection of an elastic wave using the sensor 10. In other words, when an elastic wave is detected once by one sensor 10, it becomes one hit. In FIG. 5, the vertical axis represents the number of hits, and the horizontal axis represents time. The vehicle count estimator 211 generates a graph representing a trend of the number of hits according to acquisition times of elastic waves using a plurality of pieces of elastic wave data output from the eliminator 209. Thereafter, the vehicle count estimator 211 detects an envelope in the generated graph and counts peaks of the detected envelope, thereby estimating the number of passing vehicles.

Although the precision of the graph illustrated in FIG. 5 is lower than that of FIG. 2, an approximate number of vehicles can be estimated By using other feature value acquired from elastic waves, the signal processor 20 may be configured to estimate the number of passing vehicles similarly to the case of the number of hits. Also in this case, the signal processor 20 may not include the event extractor 210. The other feature value is a feature acquired from elastic waves and, for example, is an amplitude, a total sum of amplitudes and energies per time (an integrated value thereof per time), or the like. Here, the total sum per time is not a total sum per measurement time but a total sum of feature values acquired for every certain time (for example, every 0.1 seconds) in the measurement time. In this case, the vehicle count estimator 211 generates a graph (the horizontal axis is time, and the vertical axis is a feature value) representing a trend of feature values acquired from elastic waves, detect envelopes in the generated graph, and counts peaks of the detected envelopes, thereby estimating the number of passing vehicles. For example, in a case in which a total sum per time is used as a feature value, the vehicle count estimator 211 acquires a value of the total sum acquired per time in the measurement time. The vehicle count estimator 211 generates a graph using the acquired value of the total sum, detects envelopes in the generated graph, and counts peaks of the detected envelopes, thereby estimating the number of passing vehicles. In the graph generated at this time, the horizontal axis is time, and the vertical axis is the value of a total sum acquired per time.

The signal processor 20, for example, may use extraction of envelopes in a graph in which values of individual feature values (for example, amplitude and the like) as illustrated in FIG. 2 instead of the total sum per time are plotted. The vehicle count estimator 211 can estimate the number of passing vehicles by detecting peaks in the acquired graph and counting the peaks.

Second Embodiment

In a second embodiment, a configuration in which weights and speeds of passing vehicles are estimated in addition to the number of the passing vehicles will be described. In the second embodiment, two or more sensors 10 are included in a vehicle information estimation system 100.

Figure 6:
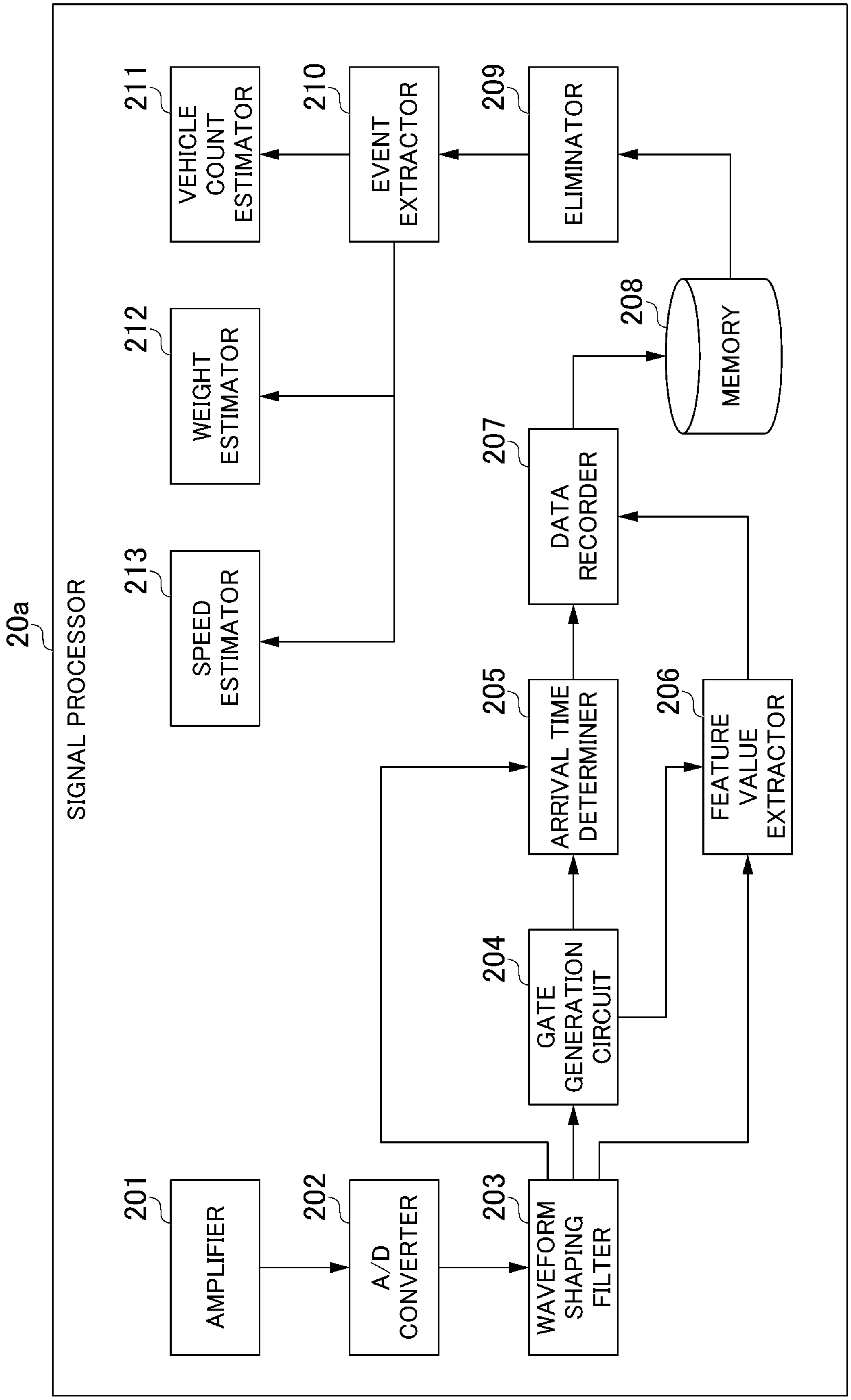
FIG. 6 is a schematic block diagram illustrating the function of a signal processor according to a second embodiment.

FIG. 6 is a schematic block diagram illustrating the function of a signal processor **20*a* according to the second embodiment. The signal processor 20*a* includes an amplifier 201, an A/D converter 202, a waveform shaping filter 203, a gate generation circuit 204, an arrival time determiner 205, a feature value extractor 206, a data recorder 207, a memory 208, an eliminator 209, an event extractor 210, a vehicle count estimator 211, a weight estimator 212, and a speed estimator 213**.

The signal processor **20*a* additionally includes the weight estimator 212 and the speed estimator 213, which is different from the configuration of the signal processor 20. The other components of the signal processor 20*a* are similar to those of the signal processor 20. For this reason, description of the entire signal processor 20*a* will be omitted, and the weight estimator 212 and the speed estimator 213** will be described.

The weight estimator 212 estimates a weight of a passing vehicle on the basis of the number of pieces of elastic wave data for each event output by the event extractor 210. The number of pieces of elastic wave data included in an event becomes larger as the weight of a passing vehicle becomes larger. For this reason, a weight of a passing vehicle and a load on a measurement place of a structure 11 can be estimated using the number of pieces of elastic wave data within an event as an index. The weight estimator 212 maintains a first table in which the number of pieces of elastic wave data and a weight of each vehicle are associated with each other and estimates a value of a weight corresponding to the number of pieces of elastic wave data included in the information of one event as being the weight of a passing vehicle. In addition, the weight estimator 212 may estimate that a load on a measurement place of the structure 11 according to a passing vehicle is higher as the weight becomes heavier. In addition, the weight estimator 212 may maintain a second table in which the number of pieces of elastic wave data and each type of a vehicle (a large vehicle, a middle vehicle, and the like) are associated with each other and estimate a value of a type of vehicle corresponding to the number of pieces of elastic wave data included in information of one event as being a type of a passing vehicle.

The speed estimator 213 estimates a speed of a passing vehicle on the basis of time series data of a plurality of elastic waves detected by a plurality of sensors 10 and an installation interval of the plurality of sensors 10. A specific estimation method used by the speed estimator 213 will be described with reference to FIGS. 7 and 8.

Figure 7:
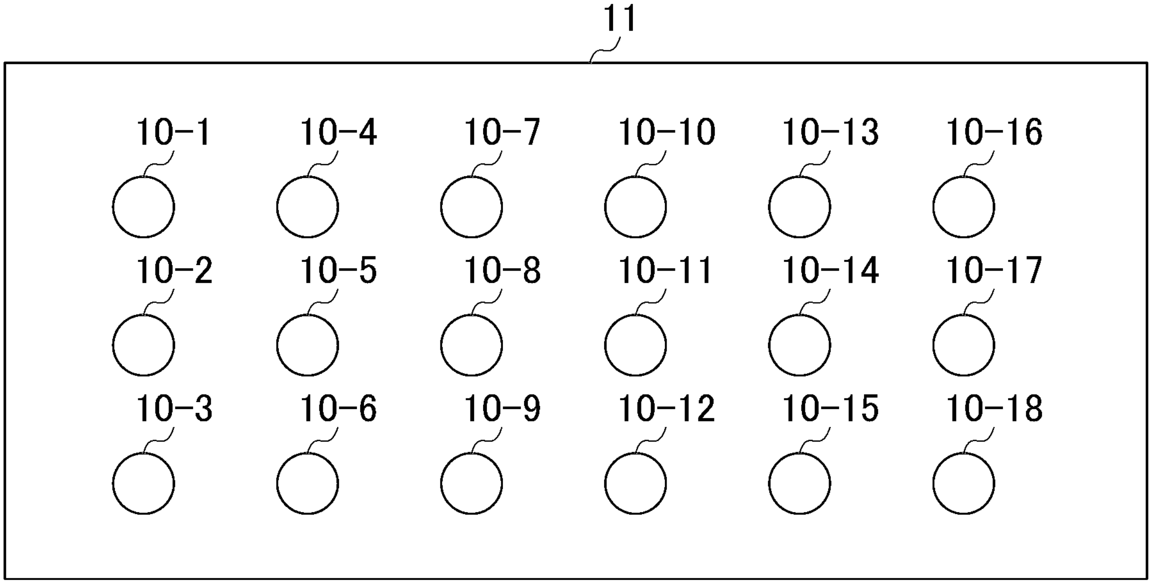
FIG. 7 is a diagram illustrating an example in which sensors are disposed in a plurality of rows according to the second embodiment.
Figure 8:
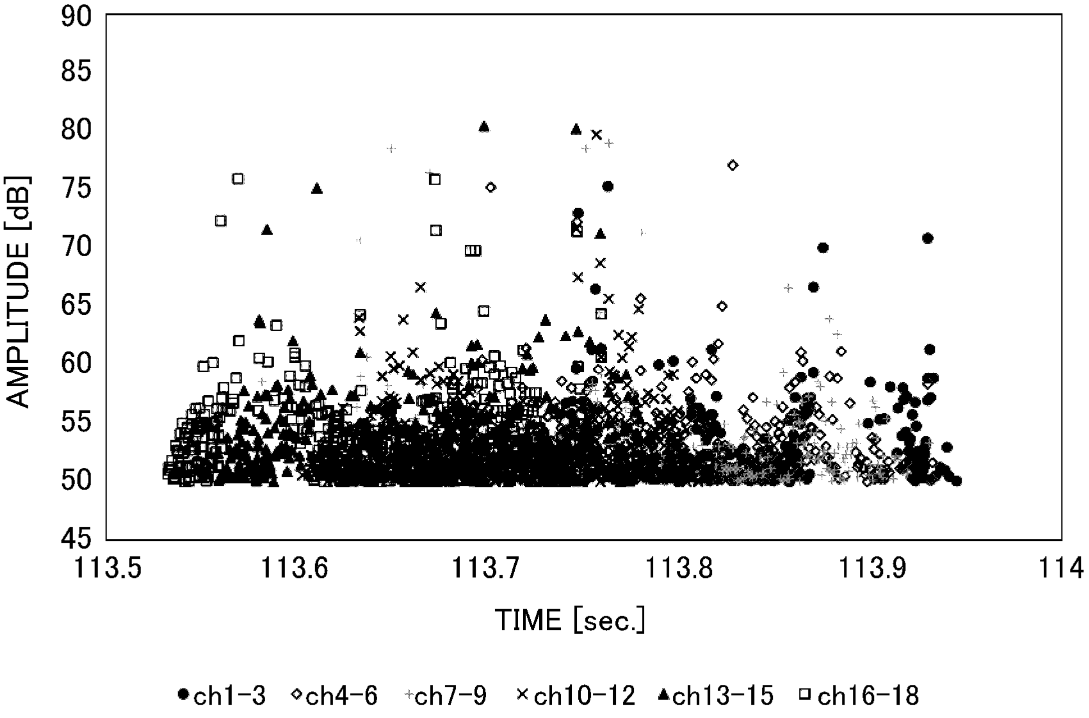
FIG. 8 is a transition diagram of data of elastic waves when one vehicle passes.

FIG. 7 illustrates an example of arrangement of a plurality of sensors 10 installed in the structure 11. In the example illustrated in FIG. 7, 18 sensors 10-1 to 10-18 are installed on a lower face of the structure 11 in 6 rows in a traveling direction of a vehicle 12. A branch number of each sensor 10 represents a channel used by the sensor. In other words, the sensors 10 respectively use different channels. A sensor interval in the traveling direction of the vehicle 12 is D. Data of elastic waves at the time of passage of one vehicle is illustrated in FIG. 8. As illustrated in FIG. 8, an elastic wave detected by each sensor 10 includes a peak at a timing at which a vehicle 12 is assumed to be right on each sensor 10, and the peak is seen to be shifted sequentially to the sensor 10 of a next row. By obtaining timings of peaks acquired in the rows of the sensors 10 from the data of elastic waves illustrated in FIG. 8 and checking whether a trend of the peaks has valid timings as passage of the vehicle 12, it can be judged whether each event is in accordance with passage of the vehicle 12, and the accuracy of estimation of the number of passing vehicles can be improved. The speed estimator 213 estimates the speed of a passing vehicle on the basis of an installation interval of the rows of the sensors 10 and a transition speed of peaks.

According to the vehicle information estimation system 100 of the second embodiment configured as described above, effects similar to those of the first embodiment can be acquired.

In addition, the vehicle information estimation system 100 according to the second embodiment can estimate other information relating to other passing vehicles in addition to the number of the passing vehicles. In this way, by introducing weights and passing speeds of passing vehicles as indices, more accurate comparison can be performed.

A modified example of the second embodiment will be described.

The vehicle information estimation system 100 according to the second embodiment may be modified similarly to the first embodiment.

The vehicle count estimator 211 may be configured to obtain information of a weight estimated for each event from the weight estimator 212 and estimate the number of passing vehicles having weights in a specific range.

In the embodiment described above, a configuration in which the weight estimator 212 estimates a weight of a passing vehicle in accordance with the number of elastic waves included in information of one event has been illustrated. The weight estimator 212 may be configured to estimate a weight of a passing vehicle on the basis of a magnitude of elastic wave data included in information of one event. Here, for example, the magnitude of elastic wave data included in information of one event is a value of a peak of the feature value of an elastic wave or a value of a peak of the number of hits. When the feature value of an elastic wave is an amplitude, a maximum value of the amplitude is the value of the peak, and, when the feature value of an elastic wave is a total sum of amplitudes and an energy per time, a value of the total sum per time becomes the value of the peak. In the case of configuring as such, the weight estimator 212 maintains a third table in which a feature value of an elastic wave or a value of the peak of the number of hits and a weight of a vehicle are associated with each other and estimates a value of a weight corresponding to the feature value of the elastic wave or the value of the peak of the number of hits included in the information of one event as being the weight of a passing vehicle. The weight estimator 212 may maintain a fourth table in which a feature value of an elastic wave or a value of the peak of the number of hits and a type a vehicle are associated with each other and estimate a value of a type of vehicle corresponding to the feature value of the elastic wave or the value of the peak of the number of hits included in the information of one event as being the type of a passing vehicle.

Third Embodiment

In a third embodiment, a configuration in which a measurement result is corrected using the estimated number of passing vehicles, and the corrected measurement is compared with a different measurement result will be described. In the third embodiment, a measurement result is assumed to represent an elastic wave source density distribution in which a density of elastic wave sources that are generation sources of elastic waves is represented. A different measurement result may be a measurement result acquired from a different place of the same structure 11 or may be a measurement result acquired by a different structure 11.

Figure 9:
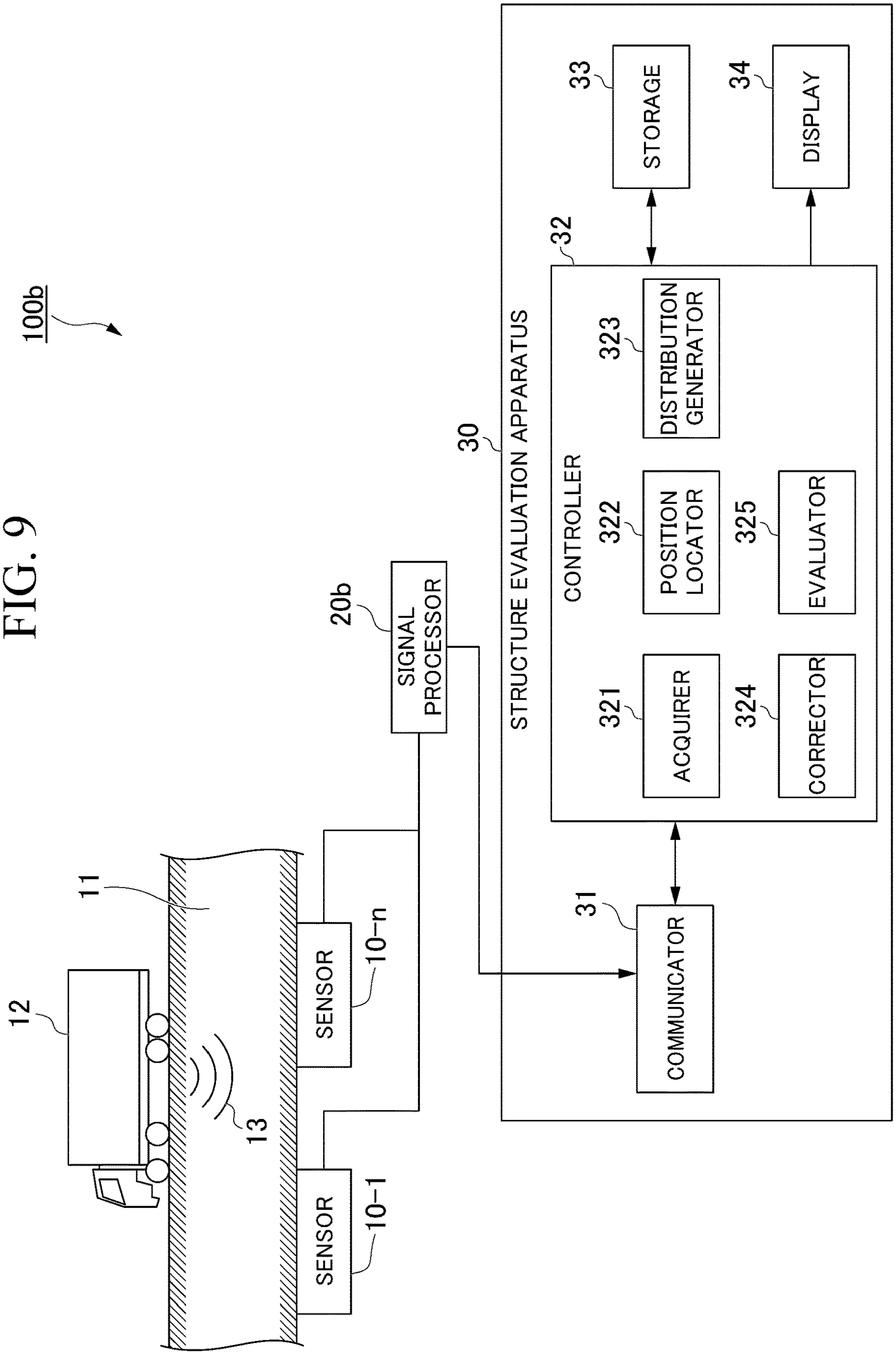
FIG. 9 is a diagram illustrating the configuration of a vehicle information estimation system according to a third embodiment.

FIG. 9 is a diagram illustrating the configuration of a vehicle information estimation system **100*b*** according to a third embodiment.

The vehicle information estimation system **100*b* includes a plurality of sensors 10-1 to 10-*n* (here, n is an integer equal to or larger than 3 in the third embodiment), a signal processor 20*b*, and a structure evaluation apparatus 30. The plurality of sensors 10 and the signal processor 20*b* are connected to be able to communicate with each other in a wired manner. The signal processor 20*b* and the structure evaluation apparatus 30** are connected to be able to communicate with each other in a wired manner.

In the third embodiment, the signal processor **20*b* is included in place of the signal processor 20, and the structure evaluation apparatus 30** is newly added.

The basic process of the signal processor **20*b* is similar to that according to the first embodiment. The signal processor 20*b* generates transmission data that includes information of events and information of the number of passing vehicles for each of the events and transmits the generated transmission data to the structure evaluation apparatus 30**.

The structure evaluation apparatus 30 includes a communicator 31, a controller 32, a storage 33, and a display 34.

The communicator 31 receives transmission data output from the signal processor **20*b***.

The controller 32 controls the entire structure evaluation apparatus 30. The controller 32 is configured using a processor such as a central processing unit (CPU) and a memory. By executing a program, the controller 32 functions as an acquirer 321, a position locator 322, a distribution generator 323, a corrector 324, and an evaluator 325.

Some or all of functional members of the acquirer 321, the position locator 322, the distribution generator 323, the corrector 324, and the evaluator 325 may be realized by hardware such as an application specific integrated circuit (ASIC), a programmable logic device (PLD), or an FPGA or may be realized by software and hardware in cooperation. A program may be recorded on a computer-readable recording medium. For example, the computer-readable recording medium is a non-transitory storage medium including a portable medium such as a flexible disk, a magneto-optical disk, a ROM, or a CD-ROM or a storage device such as a hard disk built into a computer system. The program may be transmitted through a telecommunication line.

Some of functions of the acquirer 321, the position locator 322, the distribution generator 323, the corrector 324, and the evaluator 325 do not need to be mounted in the structure evaluation apparatus 30 in advance and may be realized by installing an additional application program in the structure evaluation apparatus 30.

The acquirer 321 obtains various of kinds of information. For example, the acquirer 321 obtains transmission data received by the communicator 31. The acquirer 321 stores the acquired transmission data in the storage 33.

The position locator 322 locates a position of an elastic wave sources on the basis of sensor position information and, a sensor ID and time information included in each piece of transmission data.

Information relating to an installation position of each sensor 10 is included in the sensor position information in association with a sensor 1D. The sensor position information, for example, includes information of an installation position of each sensor 10 such as latitude/longitude or distances from a reference position of the structure 11 in a horizontal direction and a vertical direction. The position locator 322 stores the sensor position information in advance. Before the position locator 322 performs position locating of elastic wave sources, the sensor position information may be stored in the position locator 322 at a certain timing.

The sensor position information may be stored in the storage 33. In such a case, the position locator 322 obtains sensor position information from the storage 33 at a timing at which position locating is performed. A Kalman filter, a least squares method, or the like may be used for locating the positions of elastic wave sources. The position locator 322 outputs position information of each elastic wave source acquired during a measurement period to the distribution generator 323.

The distribution generator 323 has position information of a plurality of elastic wave sources output from the position locator 322 as its input. The distribution generator 323 generates an elastic wave source distribution using the input position information of the plurality of elastic wave sources. The elastic wave source distribution represents a distribution in which positions of elastic wave sources are represented. More specifically, the elastic wave source distribution is a distribution in which points representing positions of elastic wave sources are represented on virtual data representing a structure 11 that is an evaluation target with the horizontal axis set as a distance in a passing direction and the vertical axis set as a distance in a width direction. The distribution generator 323 generates an elastic wave source density distribution using the elastic wave source distribution. For example, the distribution generator 323 generates an elastic wave source density distribution by representing the position of each elastic wave source as a contour diagram.

The corrector 324 corrects the elastic wave source density distribution using a correction value that is based on a ratio between the number of passing vehicles and a comparative number of vehicles that is the number of passing vehicles acquired in a structure that is a comparison target.

The evaluator 325 evaluates a deterioration state of each structure 11 using the corrected elastic wave source density distribution and an elastic wave source density distribution acquired in the structure that is a comparison target. For example, the evaluator 325 may calculate a damage ratio by comparing the corrected elastic wave source density distribution and an elastic wave source density distribution acquired in the structure that is a comparison target with each other. The evaluator 325 evaluates an area of which the density of elastic wave sources is equal to or higher than a threshold to be a sound area and evaluates an area of which the density of elastic wave sources is lower than the threshold to be a damaged area. The evaluator 325 may calculate a ratio of the damaged area using each elastic wave source density distribution.

The storage 33 stores transmission data obtained by the acquirer 321 and a measurement result. The storage 33 is configured using a storage device such as a magnetic hard disk device or a semiconductor storage device. Transmission data obtained in advance in the structure 11 that is a comparison target and the measurement result may be stored in the storage 33.

The display 34 displays an evaluation result under the control of the evaluator 325. The display 34 is an image display device such as a liquid crystal display or an organic electro luminescence (EL) display. The display 34 may be an interface used for connecting the image display device to the structure evaluation apparatus 30. In such a case, the display 34 generates a video signal used for displaying an evaluation result and outputs the video signal to the image display device connected thereto.

Figure 10:
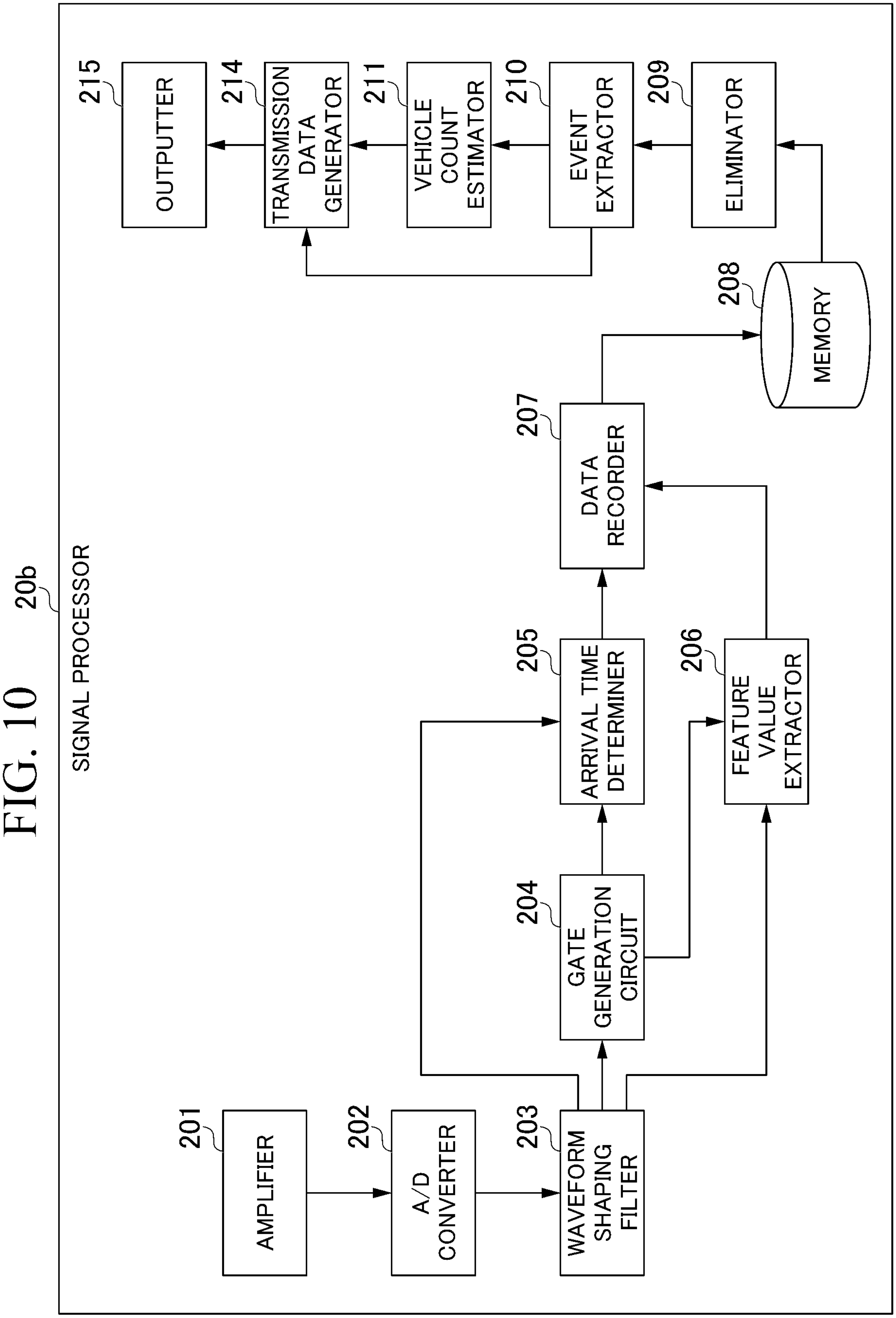
FIG. 10 is a schematic block diagram illustrating the function of a signal processor according to a third embodiment.

FIG. 10 is a schematic block diagram illustrating the function of the signal processor **20*b* according to the third embodiment. The signal processor 20*b* includes an amplifier 201, an A/D converter 202, a waveform shaping filter 203, a gate generation circuit 204, an arrival time determiner 205, a feature value extractor 206, a data recorder 207, a memory 208, an eliminator 209, an event extractor 210, a vehicle count estimator 211, a transmission data generator 214, and an outputter 215**.

The signal processor **20*b* additionally includes the transmission data generator 214, which is different from the signal processor 20. The other components of the signal processor 20*b* are similar to those of the signal processor 20. For this reason, description of the entire signal processor 20*b* will be omitted, and the transmission data generator 214** will be described.

The transmission data generator 214 generates transmission data including information of events output from the event extractor 210 and information of the number of passing vehicles for each event output from the vehicle count estimator 211. The transmission data generator 214 outputs the generated transmission data to the outputter 307.

The outputter 307 sequentially outputs the transmission data output from the transmission data generator 214 to the structure evaluation apparatus 30.

Next, a specific process of the structure evaluation apparatus 30 according to the third embodiment will be described with reference to FIGS. 11A to 11F. FIGS. 11A to 11F are diagrams illustrating a specific process of the structure evaluation apparatus 30 according to the third embodiment.

Figure 11A:
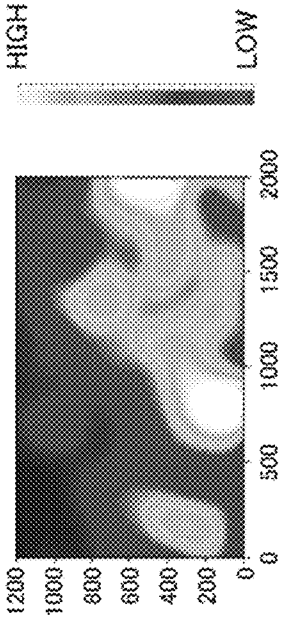
FIGS. 11A to 11F are diagrams illustrating a specific process of a structure evaluation apparatus according to the third embodiment.
Figure 11B:
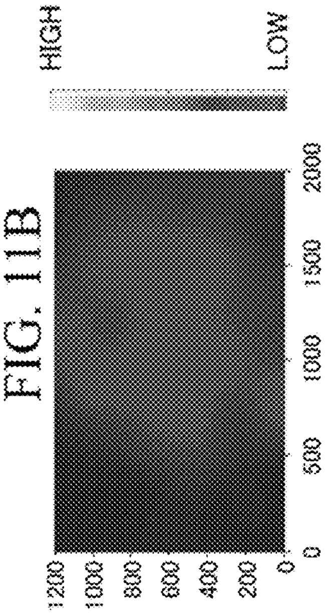

FIGS. 11A and 11B illustrate two different measurement results. FIGS. 11A and 11B are elastic wave source density distributions derived from data of elastic waves acquired through measurement for one hour. Here, the elastic wave source density distributions illustrated in FIGS. 11A and 11B are assumed to be derived by the structure evaluation apparatus 30 of the vehicle information estimation system **100*b*. As the density in the elastic wave source density distribution becomes lower, deterioration of cracks and the like disturbing propagation of elastic waves is assumed to be further progressed. When the acquired elastic wave data is displayed as elastic wave source density distributions in the same standard, the density of FIG. 11B is significantly lower than that of FIG. 11A. For this reason, in a case in which evaluation is performed using the structure evaluation apparatus 30, deterioration of the structure 11 in FIG. 11B is evaluated to be progressed more than that of the structure 11 in FIG. 11**A.

Figure 11C:
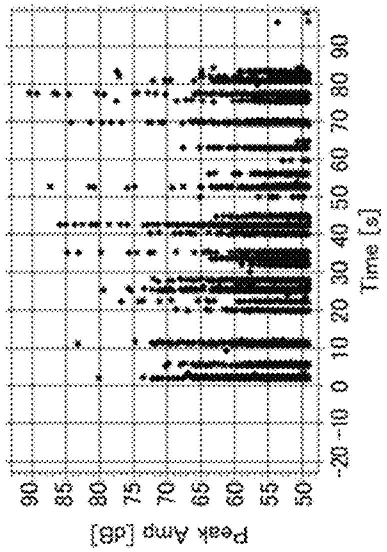
Figure 11D:
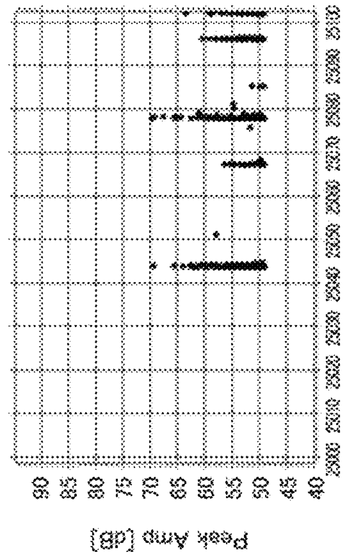
Figure 11E:
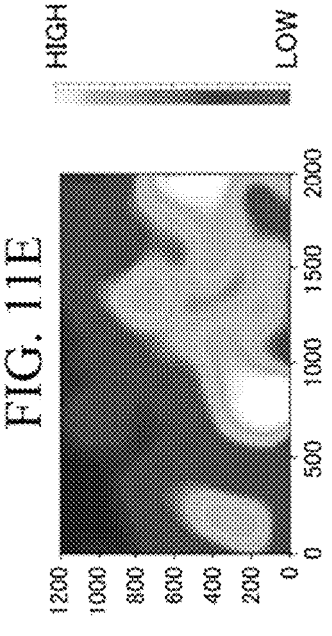
Figure 11F:
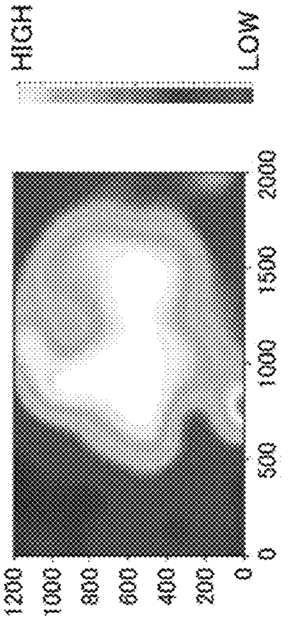

FIGS. 11C and 11D illustrate graphs acquired by selecting a part of time series data of each elastic wave. More specifically. FIG. 11C illustrates time series data of an elastic wave acquired in the structure 11 illustrated in FIGS. 11A, and 11D illustrates time series data of an elastic wave acquired in the structure 11 illustrated in FIG. 11B. Referring to FIGS. 11C and 11D, it can be understood that the passage of vehicles in FIG. 11C is more than that in FIG. 11D. When a total number of passing vehicles in a measurement period is estimated by the signal processor **20*b*, the total number is 879 in FIG. 11C, and the total number is 100 in FIG. 11D. Thus, in order to make a comparison in the same standard, it is necessary to uniformize the standard by performing a process of dividing each elastic wave source density distribution by the number of vehicles or the like. In the example illustrated in FIGS. 11A and 11B. FIG. 11A is set as a reference, and a correction is made for FIG. 11B by multiplying the elastic wave source density distribution by 879/100 that is a ratio of the numbers of passing vehicles. The corrected distribution of FIG. 11B is FIG. 11F. When the elastic wave source density distribution illustrated in FIG. 11E and the elastic wave source density distribution illustrated in FIG. 11**F are compared with each other, densities of elastic wave sources of the same degree are acquired, and degrees of deterioration are judged to be the same degree.

An example of the flow of the process of the vehicle information estimation system **100*b* will be described. Here, a sensor 10 installed in a first structure 11 (hereinafter, referred to as a "first sensor") and a sensor 10 installed in a second structure 11 (hereinafter, referred to as a "second sensor") are assumed to be different from each other. The first sensor outputs a detected elastic wave during a measurement period to the signal processor 20*b*. The signal processor 20*b* estimates the number of passing vehicles using elastic waves acquired during the measurement period from the first sensor. Then, the signal processor 20*b* generates first transmission data including information of events and information of the number of passing vehicles for each event and transmits the generated first transmission data to the structure evaluation apparatus 30**.

The second sensor outputs a detected elastic wave during a measurement period to the signal processor **20*b*. The signal processor 20*b* estimates the number of passing vehicles using elastic waves acquired during the measurement period from the second sensor. Then, the signal processor 20*b* generates second transmission data including information of events and information of the number of passing vehicles for each event and transmits the generated second transmission data to the structure evaluation apparatus 30**.

The acquirer 321 of the structure evaluation apparatus 30 causes the storage 33 to store the first transmission data and the second transmission data. The position locator 322 performs position locating of elastic wave sources on the basis of sensor position information and a sensor ID and time information included in the first transmission data. The distribution generator 323 generates a first elastic wave source distribution on the basis of position information of a plurality of elastic wave sources output from the position locator 322. The distribution generator 323 generates a first elastic wave source density distribution using the generated first elastic wave source distribution.

The position locator 322 performs position locating of elastic wave sources on the basis of sensor position information and a sensor ID and time information included in the second transmission data. The distribution generator 323 generates a second elastic wave source distribution on the basis of position information of a plurality of elastic wave sources output from the position locator 322. The distribution generator 323 generates a second elastic wave source density distribution using the generated second elastic wave source distribution.

The corrector 324 calculates a correction value based on a ratio between the number of passing vehicles included in the first transmission data and the number of passing vehicles included in the second transmission data. For example, the corrector 324 calculates a value acquired by dividing the number of passing vehicles included in the first transmission data by the number of passing vehicles included in the second transmission data as a correction value. The corrector 324 corrects the second elastic wave source density distribution using the calculated correction value. More specifically, the corrector 324 makes a correction by multiplying each pixel value of the second elastic wave source density distribution by the calculated correction value. The evaluator 325 causes the display 34 to display the first elastic wave source density distribution and the second elastic wave source density distribution.

According to the vehicle information estimation system **100*b*** according to the third embodiment configured as described above, effects that are similar to those according to the first embodiment can be acquired.

In addition, the vehicle information estimation system **100*b*** according to the third embodiment can correct the elastic wave source density distribution on the basis of the number of passing vehicles. In accordance with this, when places of which conditions of the number of passing vehicles and the like are different from each other are compared, the evaluation standard can be uniformized. For this reason, different measurement results can be compared with each other in the same conditions.

A modified example of the third embodiment will be described.

The vehicle information estimation system **100*b*** according to the third embodiment may be modified similarly to the first embodiment.

As in the second embodiment, the vehicle information estimation system **100*b* may include the weight estimator 212 and the speed estimator 213**.

A modified example common to the first embodiment to the third embodiment will be described.

In each embodiment described above, although a configuration that is executed in a case in which elastic wave data is stored in the memory 208 once, and an instruction for performing an estimation process is given has been illustrated, the estimation process may be configured to be performed in real time. In the case of configuring as such, when elastic wave data is recorded in the memory 208, the eliminator 209 reads the recorded data. A process performed after the elastic wave data is read is similar to the process illustrated in FIG. 4, and thus description thereof will be omitted.

According to at least one of the embodiments described above, by including a plurality of the sensors 10 detecting a plurality of elastic waves generated in a structure and the vehicle count estimator 211 estimating the number of passing vehicles in the structure using a plurality of elastic waves detected by the plurality of sensors 10, a traffic state can be estimated for comparing different measurement results with each other.

Some of the processes performed by the signal processor 20 according to the embodiment described above (for example, the process of estimating the number of vehicles that is performed by the vehicle count estimator 211, the weight estimating process performed by the weight estimator 212, and the speed estimating process performed by the speed estimator 213) may be realized by a computer. In such a case, by recording a program used for realizing the function on a computer-readable recording medium and causing the computer system to read and execute the program recorded on this recording medium, the function may be realized. The "computer system" described here includes an OS and hardware such as peripherals. The "computer-readable recording medium" represents a portable medium such as a flexible disc, a magneto-optical disk, a ROM, or a CD-ROM or a storage device such as a hard disk built into a computer system. Furthermore, the "computer-readable recording medium" may include a medium dynamically storing the program for a short time such as a communication line of a case in which the program is transmitted through a network such as the Internet or a communication circuit line such as a telephone line and a medium storing the program for a predetermined time such as an internal volatile memory in the computer system that becomes a server or a client in such a case. The program described above may be a program used for realizing a part of the function described above or a program that can realize the function described above in combination with a program that is already recorded in the computer system and may be realized using a programmable logic device such as an FPGA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vehicle information estimation system comprising:

at least one sensor configured to detect elastic waves generated from a structure and output an electrical signal representative of the detected elastic waves;

an electronic signal processor comprising:

an electronic filter configured to eliminate noise components from the electrical signal output by the at least one sensor and output a noise-eliminated electrical signal; and a vehicle count estimator configured to estimate the number of vehicles that have passed through on the structure using the noise eliminated electrical signal output by the electronic filter.

2. The vehicle information estimation system according to claim 1, wherein:

the electronic signal processor further comprises a classifier configured to classify a plurality of elastic waves acquired during a measurement period into a plurality of groups, and the vehicle count estimator estimates the number of the plurality of groups as being the number of vehicles.

3. The vehicle information estimation system according to claim 2, wherein the vehicle count estimator estimates the number of groups acquired by excluding groups in which the number of elastic waves included in the groups is smaller than a first threshold as being the number of vehicles.

4. The vehicle information estimation system according to claim 3, wherein the electronic signal processor further comprises a weight estimator configured to estimate a weight of the vehicles or a type of the vehicles on the basis of the number of elastic waves included in the groups or a size of the groups.

5. The vehicle information estimation system according to claim 2, wherein the electronic signal processor further comprises a weight estimator configured to estimate a weight of the vehicles or a type of the vehicles on the basis of the number of elastic waves included in the groups or a size of the groups.

6. The vehicle information estimation system according to claim 1, wherein the vehicle count estimator plots the number of a plurality of detected elastic waves acquired during a measurement period or a feature value of each of the plurality of elastic waves in accordance with acquisition times, detects peaks by detecting envelopes based on the plot, and estimates the number of the detected peaks as being the number of vehicles.

7. The vehicle information estimation system according to claim 1, wherein the at least one sensor comprises a plurality of sensors, wherein the plurality of sensors are installed with a predetermined interval therebetween in the structure in a traveling direction of the vehicles, and the electronic signal processor further-comprises a speed estimator configured to estimate speeds of the vehicles on the basis of time series data of the plurality of elastic waves detected by each of the plurality of sensors and an installation interval of the plurality of sensors.

8. The vehicle information estimation system according to claim 1, wherein the at least one sensor comprises a plurality of sensors, and the electronic signal processor further-comprises:

a position locator configured to locate a position of an elastic wave sources on the basis of the plurality of elastic waves detected by each of the plurality of sensors;

a distribution generator configured to generate an elastic wave source density distribution representing a density of the elastic wave sources; and a corrector configured to correct the elastic wave source density distribution using a correction value based on a ratio between the number of vehicles that have passed through on the structure and the number of vehicles, which have passed, acquired in a structure that is a comparison target.

9. The vehicle information estimation system according to claim 1, wherein the electronic signal processor further comprises an eliminator configured to eliminate elastic waves of which a value of amplitude is smaller than a second threshold in the elastic waves detected by the at least one of sensor.

10. A vehicle information estimation method comprising:

receiving an electrical signal representative of elastic waves detected by at least one sensor installed in a structure;

processing the electrical signal to eliminate noise components, using an electronic filter, and output a noise-eliminated electrical signal; and estimating the number of vehicles that have passed through on the structure using the noise eliminated electrical signal.

11. A non-transitory computer readable recording medium storing a computer program which enables a computer to execute the following processing:

receiving an electrical signal representative of elastic waves detected by at least one sensor installed in a structure;

processing the electrical signal to eliminate noise, using an electronic filter, and output a noise-eliminated electrical signal; and estimating the number of vehicles that have passed through on the structure using the noise eliminated electrical signal.

* * * * *